United States Patent
Garcia et al.

(10) Patent No.: US 8,732,857 B2
(45) Date of Patent: May 20, 2014

(54) CLIENT-SIDE ACCESS CONTROL OF ELECTRONIC CONTENT

(75) Inventors: Fermin Otniel Garcia, San Diego, CA (US); Roberto Romero Saldivar, Tijuana (MX)

(73) Assignee: Sosvia, Inc., Bonita, CA (US)

( * ) Notice: Subject to any disclaimer, the term of this patent is extended or adjusted under 35 U.S.C. 154(b) by 253 days.

(21) Appl. No.: 12/978,051

(22) Filed: Dec. 23, 2010

(65) Prior Publication Data

US 2012/0167231 A1    Jun. 28, 2012

(51) Int. Cl.
*G06F 21/00*    (2013.01)

(52) U.S. Cl.
USPC .............................................. 726/30; 726/28

(58) Field of Classification Search
USPC ...................................................... 726/27, 29
See application file for complete search history.

(56) References Cited

U.S. PATENT DOCUMENTS

| | | |
|---|---|---|
| 6,285,999 B1 | 9/2001 | Page |
| 6,738,678 B1 | 5/2004 | Bharat et al. |
| 6,754,873 B1 | 6/2004 | Law et al. |
| 6,799,176 B1 | 9/2004 | Page |
| 7,058,628 B1 | 6/2006 | Page |
| 7,117,206 B1 | 10/2006 | Bharat et al. |
| 7,783,639 B1 | 8/2010 | Bharat et al. |
| 7,802,278 B2 * | 9/2010 | Kweon ........................... 725/30 |
| 8,145,636 B1 | 3/2012 | Jeh et al. |
| 2011/0010365 A1 | 1/2011 | Garcia et al. |
| 2011/0138409 A1* | 6/2011 | Svensson et al. ................ 725/25 |

FOREIGN PATENT DOCUMENTS

WO    2011005810 A1    1/2011

OTHER PUBLICATIONS

Richardson, Matthew, et al., "The intelligent surfer: probalilistic combination of link and content information in pagerank," Advances in Neural Information Processing Systems, Dec. 3, 2001, 14, Neural Information Processeing Systems: Natural and Synthetic, NIPS, Vancouver, British Columbia, Canada (Retrieved from the Internet: URL:http://books.nips.cc/pap, Aug. 12, 2001) (8 pages).

Haveliwala, Taher H., "Topic-Sensitive PageRank: a context-sensitive ranking algorithm for web search," IEEE Transactions on Knowledge and Data Engineering, Dec. 15, 2002, IEEE Service Center, Los Alamitos, CA, US (22 pages).

International Patent Application No. PCT/US2010/041135, International Search Report and Written Opinion mailed Oct. 18, 2010 (7 pages).

(Continued)

*Primary Examiner* — Jung Kim
*Assistant Examiner* — Ghodrat Jamshidi
(74) *Attorney, Agent, or Firm* — Kilpatrick Townsend & Stockton LLP (57) ABSTRACT

Systems, methods and computer program products for controlling access to electronic content on a client device are provided. Whether access to electronic content is allowed or blocked is based on information and processes performed at the client device. Controlling access to electronic content on a client device can involve locally determining whether access to the electronic content will be allowed, blocked, or will depend upon further analysis performed by a remote device, such as a server. If a webpage is requested, for example, a client device may compare the URL address of the requested webpage, along with keywords and phrases found on the webpage, to locally-stored updateable lists of banned URL addresses and banned keywords and phrases to determining whether access to the electronic content will be allowed, blocked, or will depend upon further analysis.

19 Claims, 3 Drawing Sheets

(56) References Cited

OTHER PUBLICATIONS

U.S. Appl. No. 12/498,407, Non-Final Office Action mailed Oct. 3, 2011 (14 pages).
International Patent Application No. PCT/US2010/041135, International Preliminary Report on Patentability mailed Jan. 10, 2012 (5 pages).
U.S. Appl. No. 12/498,407, Response to Non-Final Office Action filed Apr. 3, 2012 (31 pages).
U.S. Appl. No. 12/498,407, Final Office Action mailed Aug. 29, 2012 (20 pages).
U.S. Appl. No. 12/498,407, Response to Final Office Action filed Nov. 29, 2012 (14 pages).

* cited by examiner

CLIENT-SIDE ACCESS CONTROL OF ELECTRONIC CONTENT

TECHNICAL FIELD

This disclosure relates generally to techniques for allowing or preventing access on client computing devices to electronic content available from remote computing devices. More particularly, this disclosure relates to methods and systems that determine whether to allow or block access to electronic content such as webpage content based on webpage address, text, and other information associated therewith.

BACKGROUND OF THE INVENTION

A variety of electronic content is available though the Internet and other electronic networks. Remotely available electronic content can be accessed in various ways and is commonly accessed by a user entering or selecting a Uniform Resource Locator (URL) address that is used to identify a storage location of a particular webpage and retrieve the webpage for display on the user's device. Remotely available electronic content is also commonly accessed by a user selecting a link within, for example, a web page. Such a link may identify a URL or otherwise be used to identify a storage location of the particular linked-to webpage and retrieve the webpage for display on the user device. Search engines, database management systems, and other information retrieval systems are also available to retrieve information that corresponds to a user's requests and queries.

However requested, electronic content that is received for use on a user's device can include explicit content or other content that may not be considered suitable for children and adolescents. It is generally desirable to have a system which allows for access to some of the remotely accessible electronic content, but which monitors, filters and prevents access to content which is unsuitable for children, adolescents, or that is otherwise unwanted by the requestor of the electronic content. Many parents and guardians, in particular, would like to prevent their children from accessing webpages that depict sex, violence, and other topics considered by them to be unsuitable for their children. On the other hand, parents and guardians often want to allow their children to access other content, such as educations materials and games.

SUMMARY OF THE INVENTION

Systems, methods and computer program products for controlling access to electronic content on a client device are provided. Whether access to electronic content is allowed or blocked is based on information and processes performed at the client device. Controlling access to electronic content on a client device can involve locally determining whether access to the electronic content will be allowed, blocked, or will depend upon further analysis performed by a remote device, such as a server. If a webpage is requested, for example, a client device may compare the URL address of the requested webpage, along with keywords and phrases found on the webpage, to locally-stored updateable lists of banned URL addresses and banned keywords and phrases to determining whether access to the electronic content will be allowed, blocked, or will depend upon further analysis.

An exemplary method comprises identifying, at a computer device, a request for electronic content, wherein the electronic content is available to the computer device through a network and determining whether access to the electronic content will be allowed, blocked, or will depend upon a remote analysis performed by a remote device. The exemplary method further comprises blocking access to the electronic content on the computer device if it is determined that access will be blocked, allowing access to the electronic content on the computer device if it is determined that access will be blocked, and requesting, from the computer device, that the remote device perform the remote analysis if it is determined that access will depend upon the remote analysis. The exemplary method may further comprise receiving a response to the request and using the response to determine whether access to the electronic content will be blocked or allowed. The remote analysis may be a more robust analysis than an analysis of the electronic content performed by the local computer device in determining whether access to the electronic content will be allowed, blocked, or will depend upon the more robust remote analysis by the remote device.

Embodiments of the present disclosure may be embodied as a system executing at least one program module for controlling access to electronic using specific algorithms, for example, to determine whether a webpage or other electronic content should be allowed or blocked on a client device. Embodiments may also be embodied as a computer-implemented method or a computer program product having stored thereon at least one program module for providing such functionalities. These and other aspects and features will be described further in the detailed description below in connection with the appended drawings and claims.

DETAILED DESCRIPTION OF EXEMPLARY EMBODIMENTS

Embodiments disclosed herein control access to electronic content on a client device in various ways. A client device generally determines whether to allow or block access to electronic content such as webpage content based on webpage address, text, and other information associated therewith. Such a determination may involve a client device identifying that the client device's user is requesting electronic content available at an address associated with a particular URL address. The client device may block access to that electronic content if that electronic content is identified on its locally-stored list of banned electronic content. Such a locally-stored list of banned electronic content may identify the banned items of electronic content in various ways. In one embodiment, banned items of electronic content are identified in such a list by the URL address or other address information that identifies or can be used to identify an address at which the electronic content is available. A list of banned electronic items may be maintained on the client device and, in one embodiment, updated by accessing a remote server.

Even if the electronic content is not identified on a list of banned electronic content or even if no such list is used, a client device may determine to block access to the electronic content based on one or more other determinations. The client device may block access to electronic content based on an analysis of the electronic content itself on the client device. For example, the client device may obtain webpage content from an address associated with a user-entered URL and determine to block the webpage based on the presence of certain words in the webpage. As another example, the client device may determine to block access to a webpage based on the results of one or more algorithms that search for certain keywords and phrases. The client device may maintain keywords, phrases, algorithms, and other information locally but may update such some or all of such information by accessing a remote server.

As yet another example of blocking access based on analysis of the electronic content itself, a client device may score a webpage, for example, using one or more algorithms, and determine whether to allow access to or block access to the webpage based on the score. In one embodiment, such a score is used to identify whether to block access to the webpage, whether to allow access to the webpage, or whether to conduct further analysis. Further analysis may be conducted locally on the client device. Additionally, or alternatively, the client device may request that a remote device such as a server conduct further analysis, for example, and receive a recommendation of whether to allow or block questionable electronic content from the server.

A client device can generally use locally-available information and algorithms to determine whether to allow access or block access to electronic content on the client device. A server can supplement such access control functionality by providing updated information, such as banned electronic content lists, keywords, phrases, and algorithms, used by the client device. A server can also supplement the client device's access control functionality by resolving determinations for questionable content, i.e., content that the client device does not readily determine to allow or block.

Reference will now be made in detail to various and alternative exemplary embodiments and to the accompanying figures, in which like numerals represent substantially identical elements. Each exemplary embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

Generally, the present invention provides systems, methods and computer program products for controlling access to electronic content on a client device. An access control module may be provided on a computer device and used in a system that includes any number of distributed data storage devices, servers and/or other computing devices. Any combination of computer software, firmware or hardware may be used to provide access control features. For example, various embodiments of the present invention may be practiced in the context of distributed computing environments comprising multiple network computing devices, as illustrated in FIG. 1.

Figure 1:
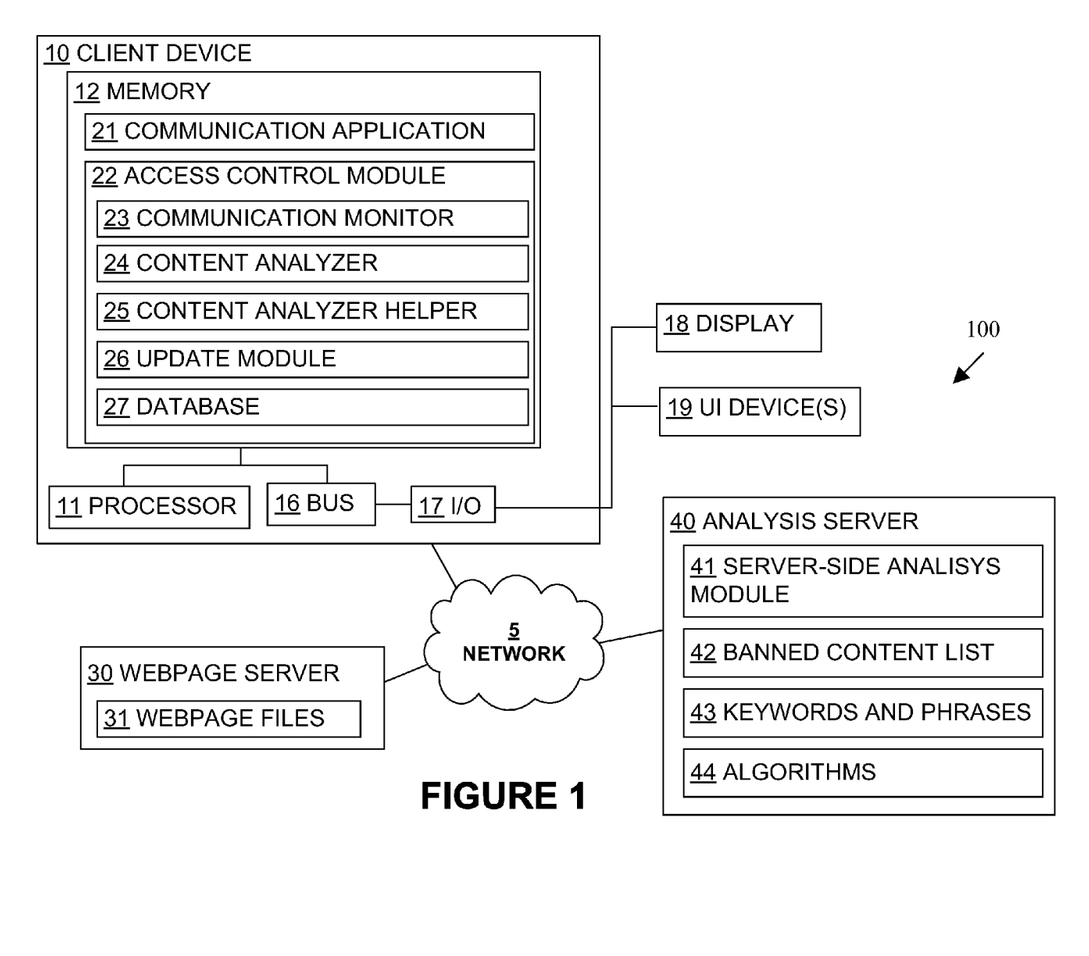
FIG. 1 is a block diagram illustrating an exemplary operating environment for the implementation of various embodiments.

In an exemplary computing environment 100 of FIG. 1, various computing devices (e.g., client device 10, servers 30, 40) can be interconnected via a network 5. The network 5 may comprise any telecommunication and/or data network through which network computing devices can exchange information, including a LAN, a WAN and any combination thereof. Portions of the network 5 may be wired and other portions may be wireless.

A network computing device can be any computing device capable of transmitting and receiving information over a network 5. In general, a computing device includes a processing unit, such as processor 11 of client device 10, a system memory, such as memory 12 of client device 10, and a system bus, such as bus 16 of client device 10, that couples various system components, including the system memory, to the processing unit. The system bus can comprise any of several types of bus structures, including a memory bus or memory controller, a peripheral bus, or a local bus, using any of a variety of bus architectures. The system memory may comprises a read-only memory (ROM) and a random access memory (RAM). A basic input/output system (BIOS) containing the basic routines that help to transfer information between elements within the computing device, such as during start-up, is typically stored in the ROM.

In addition to ROM and RAM, a computing device may include one or more other machine readable storage device, such as a hard disk drive for reading from and writing to a hard disk, a magnetic disk drive for reading from or writing to a removable magnetic disk, such as a floppy disk, and/or an optical disk drive for reading from or writing to a removable optical disk, such as a CD, DVD or other optical media, etc. Machine readable storage devices are typically connected to the system bus by appropriate interfaces. Machine readable storage devices can provide nonvolatile storage of computer-executable instructions, data structures, program modules (e.g., an operating system, application, libraries, etc.) and other data. Program modules include computer-executable instructions representing routines, sub-routines, programs, objects, components, data structures, etc., for causing a processing unit to perform particular tasks or implement particular abstract data types.

A computing device typically includes one or more input devices, such as a keyboard and/or a pointing device, that can be used to enter commands and information to the computing device. Similarly, a computing device typically include one or more output devices, such as a display device. Exemplary client device 10 includes input/output functionality 17 that connects to a display 18 and various user interface devices 19. A computing device may be connected to the network 5 through a network interface, adapter, modem or other suitable communications device. Input devices, output device and communications devices may be connected to the processing unit through an appropriate interfaces coupled to the system bus.

FIG. 1 illustrates an exemplary operating environment 100. As shown in FIG. 1, a client device 10 can be connected to a network 5 to access one or more servers, such as servers 30, 40, and other computer devices (not shown). A client device 10 can comprise a desktop computer, a laptop computer, a wireless network device, such as a personal digital assistant ("PDA") or a smart phone, a handheld computer, or any other wired or wireless processor-driven device capable of communicating with the resources of the network 104. A client device 10 may execute a communication application 21, such as a web browser, or another suitable application for interacting with webpage files or other electronic content found at various network 5 addresses. As is well known in the art, webpage files can comprise text, graphic, images, sound, video, scripts, applications, applets, and other multimedia or data objects, that can be transmitted via the network 5. For example, webpage files can comprise one or more HyperText Markup Language (HTML) files.

Client device 10 further comprises an access control module 22 that can be used to control access to electronic from the network 5 on the client device, for example, by blocking or allowing access to such content on the communication application 21. Access control module is shown as including various specific modules for exemplary purposes. Such exemplary modules include, in the example of FIG. 1, a communication monitor 23, a content analyzer 24, a content analyzer helper 25, an update module 26, and a database 27. While these modules are illustrated as collectively provided within access control module 22, one or more of such modules may be omitted or included in a module separate from access control module 22. Additional modules may also be included within access control module 22. For example, an optical character recognition program module (not shown) or the like may be included for identifying keywords and other attributes within non-textual portions of a webpage file or other electronic content.

FIG. 1 illustrates servers 30, 40 connected to network 5. This environment is provided for illustration and, more generally, a network 5 may connect one or more various types of computing devices including, but not limited to, client devices, servers, and dedicated storage facilities, such as databases. Server devices 30, 40 may execute software for interacting with a client device 10 via the network 5. Servers 30 and 40 are illustrated as making various electronic content and information available to client device 10 over network 5. Server 30 hosts (i.e., provide access to) one or more webpages by providing webpage files 31 in response to requests for the webpage files 31. Server 40 comprises a server-side analysis module 41 for analyzing electronic content, such electronic content that client device 10 identifies as questionable. Server 40 can provide the results of its server-side analysis module 41 to client device 10. Server 40 may further provide or make other information available for use on client device 10 including, but not limited to, a banned content list 42, keywords and phrases 43, and algorithms 44 for used in client-side access control determinations. Server 40 may store the banned content list 42, keywords and phrases 43, and algorithms 44 in a local storage device (e.g., RAM and/or ROM) and/or in one or more database or other network devices.

Referring again to client device 10, the access control module 22 and its exemplary sub-modules 23, 24, 25, 26, 27 may comprise computer-executable instructions for performing some or all of the methods described hereinafter. The access control module 22, whether embodied in software or firmware, may be stored in one or more machine readable storage devices, thereby making a computer program product in accordance with the invention. The computer program product containing the computer-executable instructions may be used by either executing the code directly from the client device (or user's device), by copying the instructions from a storage device into another storage device of the client device, such as a hard disk, RAM, etc., or by transmitting the instruction over the network 5 for execution by a remote network computing device.

Figure 2:
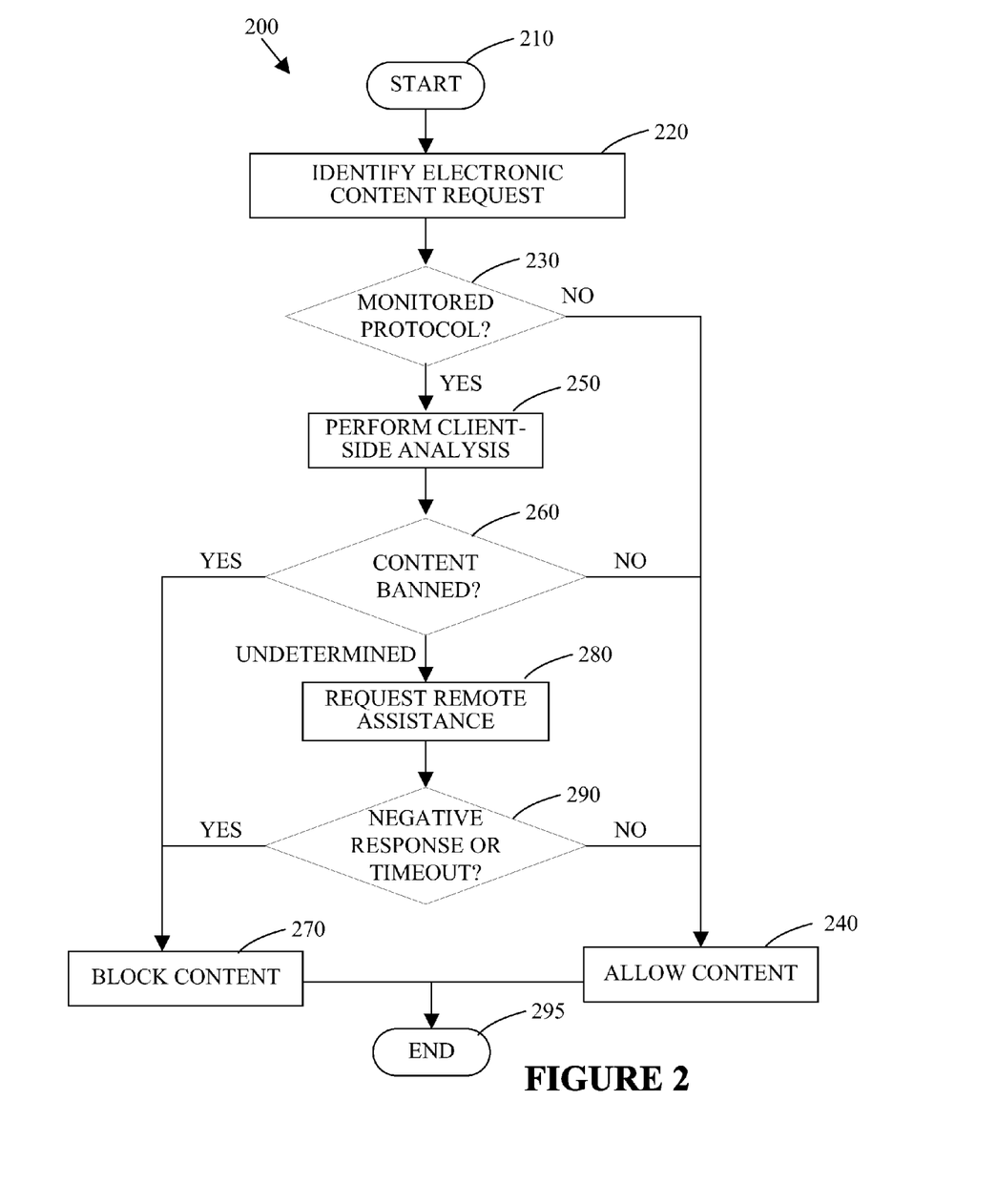
FIG. 2 is a flow chart illustrating an exemplary method for a client device to control access to electronic content.

FIG. 2 is a flow chart illustrating an exemplary method 200 for a client device to control access to electronic content. Method 200 may be performed by a various types of client devices, i.e., where "client device" is used to broadly refer to any device that requests and receives electronic content from a server or other computer device. For purposes of illustration, the method 200 is described with reference to functions provided by the exemplary access control module 22 and its sub-modules 23, 24, 25, 26, 27 of FIG. 1. Other implementations are of course possible.

The exemplary method 200 starts in start block 210 and proceeds to identify an electronic content request, as shown in block 220. An electronic content request may be identified, for example, when a user inputs of a URL address into the web browser's navigation field and initiates access of the associated webpage. As another example, electronic content may be requested when a user selects a result link from a search engine results list. Identification of an electronic content request may be performed by communication monitor 23 of the exemplary access control module 22 of FIG. 1. Communication monitor 23 may be a process the runs in the background or otherwise on client device 10 to detect any attempts to use the client's ports or other communication components. Disabling the communication monitor 23 may require administrator privileges on the client device 10.

After identifying a request for electronic content, method 200 may determine whether the request for electronic content is associated with a monitored protocol, as shown in block 230. In one embodiment, the communication monitor 23 of FIG. 1 is configured to monitor only particular components associated with particular types of communications. For example, communication monitor 23 may only monitor a particular communication port or ports associated with hypertext transfer protocol (HTTP), e.g., port 80, to target control of access to world wide web electronic content. HTTP functions as a request-response protocol in which a web browser or other application acts as a client while an application running on a computer hosting a web page functions as a server. A client submits an HTTP request and the server retrieves from its storage or generates a web page, e.g., the Hyper Text Markup Language (HTML) files and other files that makeup the webpage, for returning in a response to the client. Thus, to control webpage access, communication monitor 23 may monitor port 80 and/or intercept any attempts to use that port to request a webpage.

If the electronic content request is not associated with a monitored protocol, the method 200 proceeds to block 240 and allows access to the electronic content. As examples, allowing access to the electronic content may be accomplished by communication monitor 23 allowing the request to be sent to the server and/or allowing the response to the request to be received through the communication component, e.g., through the port. Additionally, or alternatively, allowing access to the electronic content may be accomplished by controlling the application that renders or plays the electronic content. For example, this may involve allowing a web browser or other application that initiated the request to display the requested electronic content. In one embodiment, a content access module 22 is included within, rather than separate from, a web browser to facilitate the web browser using the content access module 22 to determine whether to display requested electronic content.

If, in block 230, the method 200 determines that the electronic content request is associated with a monitored protocol, the method 200 proceeds to perform client side analysis, as shown in block 250. For example, a URL address of an electronic content request may be provided to content analyzer 24 of FIG. 1. For example, communication monitor 23 may intercept a request for electronic content and identify a URL address or other electronic content identifying information in the request and provide that information to content analyzer 24 for further analysis.

Performing the client-side analysis may involve determining whether the electronic content associated with the request is banned, as shown in block 260. For example, content analyzer 24 may receive electronic content identifying information and determine whether the electronic content will be banned, not banned, or is questionable.

Figure 3:
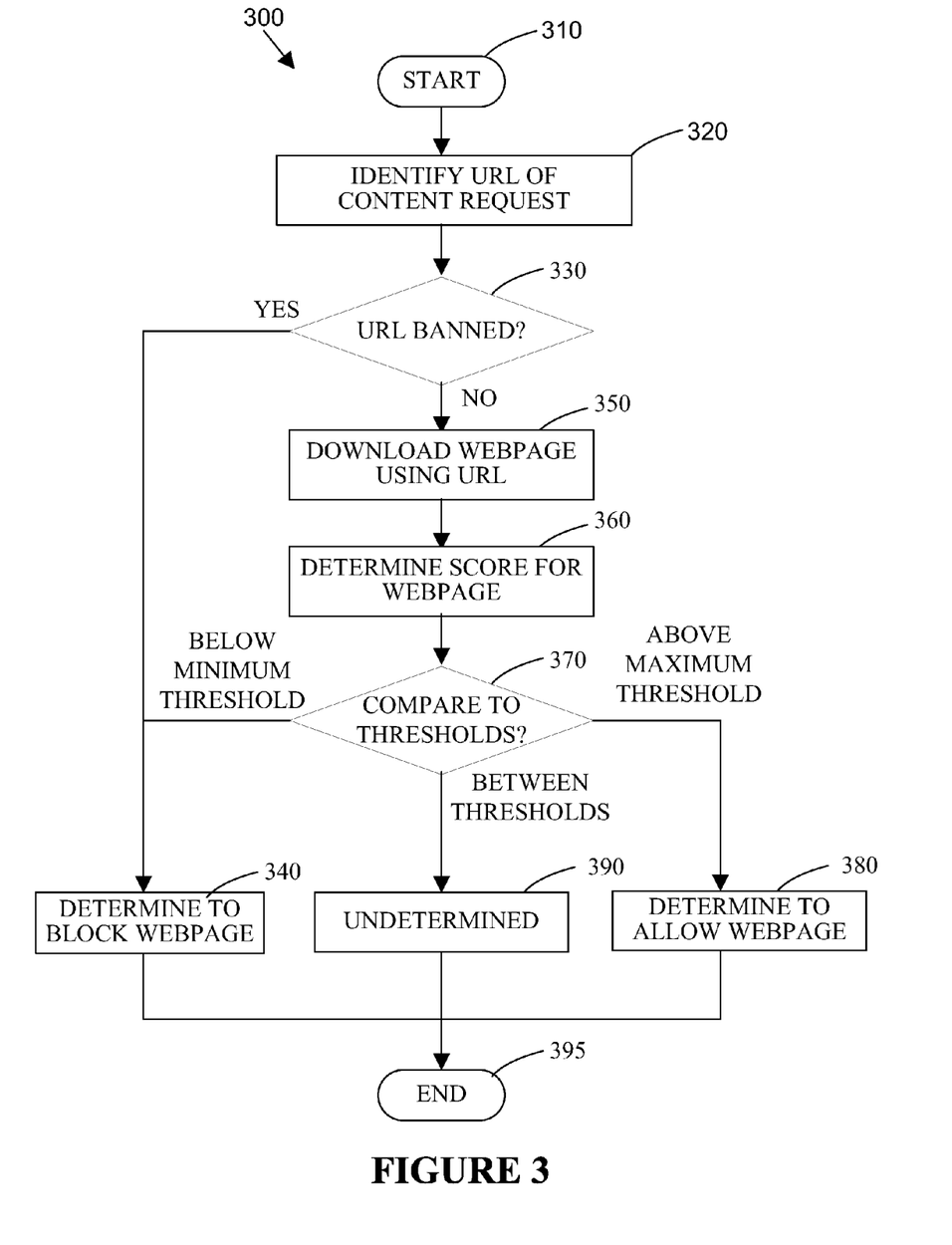
FIG. 3 is a flow chart illustrating an exemplary method for a client device to determine whether a web page should be blocked, allowed, or is questionable.

FIG. 3 is a flow chart illustrating an exemplary method 300 for a client device to determine whether a web page should be blocked, allowed, or is questionable. Specifically, method 300 is provided as an example of determining whether electronic content is should be blocked, allowed, or is questionable as shown in block 200. Method 300 may, as an example, be performed by the content analyzer of FIG. 1. Other methods, techniques, and components may additionally, or alternatively, be used to determine whether electronic content should be blocked, allowed, or is questionable. After starting in block 310, method 300 of FIG. 3 identifies a URL address of the electronic content request, as shown in block 320. The method 300 determines whether the URL address is on a list of banned URL addresses, as shown in block 330. For example, content analyzer 24 may access a list of banned URL addresses stored in database 27 also on the client device 10 in FIG. 1.

If the URL address is identified on the list of banned URL addresses stored in database 27, the method 300 determines that the webpage should be blocked as shown in block 340. If not, the method proceeds to block 350 and downloads the webpage using the URL address. In an alternative embodiment, the webpage is already downloaded and available for the content analyzer 24 to analyze and, thus, step 350 can be omitted.

Whenever and however the webpage is obtained, the content analyzer 204 can apply one or more algorithms to analyze the text and other items of the content within the webpage. Such algorithms may compare the keywords and phrases found on the requested webpage to the banned keywords and phrases stored in the database 27. In the example of FIG. 3, the content analyzer 24 uses one or more algorithms to calculate a numerical value or score representing the content of the webpage, as shown in block 360.

A score can be determined for a webpage in various ways. In one embodiment, a score simply reflect or provide a count of the number of times particular words, e.g., identifying that there are six words related to sex contained with the webpage. Another exemplary embodiments determines a word score by using particular word values and weights assigned to particular words so that the web page score is the sum of the word scores of the words contained in the web page. As a specific example such a technique may involve assigning content-neutral words a zero word score while assigning word scores to other words that are respectively larger for more sexually-explicit words. In yet another example, webpages are scored based on determinations of whether the web pages are associated with particular topics or categories. In a particular example, web pages may be scored based on the web page's relevance to selected content categories as described by U.S. patent application Ser. No. 12/498,407, filed Jul. 7, 2009, and entitled "CONTENT CATEGORY SCORING FOR NODES IN A LINKED DATABASE," the entirety of which is incorporated herein by this reference.

However determined, a score for the web page can be used to determine how the content should be treated on a client device. In this example, webpage scores are provided on a scale in which content having a lower score is considered more objectionable than content having a higher score. Other embodiments may use a different scale, for example, in which content having a higher score is considered more objectionable than content having a lower score.

After determining a score, the method 300 of FIG. 3 proceeds to compare the score with certain thresholds, as shown in block 370. If the score is below a minimum threshold, the method 300 determines that the webpage should be blocked as shown in block 340. If the score is above a maximum threshold, then the method 300 determines that the webpage should be allowed as shown in block 380. If the score is between the minimum threshold and the maximum threshold, then the method 300 determines that it is undetermined whether the webpage should be allowed or blocked, as shown in block 390. In other words, the webpage is identified as "questionable." The method concludes in end block 395.

The results of method 300 provide examples of results that may be returned from the determination of whether content is banned in block 260 of FIG. 2. In FIG. 2, if the electronic content is not banned, as determined by block 260, the method 200 proceeds to block 240 to allow access to the electronic content. If, the electronic content is banned, then the method then the method proceeds to block access to the content in block 270. As examples, blocking access to the electronic content may be accomplished by communication monitor 23 blocking the request from being sent to the server and/or intercepting or otherwise blocking any response to the request from being received through the communication component, e.g., through the relevant communication port. Additionally, or alternatively, blocking access to the electronic content may be accomplished by controlling the application that renders or plays the electronic content. For example, this may involve controlling a web browser or other application that initiated the request to display the requested electronic content. In one embodiment, a content access module 22 is included within, rather than separate from, a web browser to facilitate the web browser using the content access module 22 to determine whether to display requested electronic content.

In FIG. 2, if the electronic content is questionable, as determined by block 260, the method 200 proceeds to block 280 to request remote assistance. For example, content analyzer helper 25 may access analysis server 40 by, for example, identifying the questionable electronic to the analysis server 40, for example, by providing a URL address associated with the requested electronic content. The analysis server 40 may then perform an analysis of the electronic content, if it has not already analyzed the electronic content, and provide results to the client device 10. In one example, a server-side analysis module is used to analyze content. It may perform a more robust and/or computationally-intensive analysis of the electronic content than was performed, for example, at the client device 10 in block 250. The server-side analysis module 41 may, for example, identify keywords and phrases in the electronic content and determine, using one or more algorithms, whether the webpage contains banned content. As another example in the context of webpages, webpages may be analyzed based on determinations of whether the web pages are associated with particular topics or categories. In a particular example, web pages may be analyzed and/or scored based on the web page's relevance to selected content categories as described by U.S. patent application Ser. No. 12/498,407, filed Jul. 7, 2009, and entitled "CONTENT CATEGORY SCORING FOR NODES IN A LINKED DATABASE," the entirety of which is incorporated herein by this reference.

Providing more robust analysis on a remote sever such as server 40 can provide various advantages. Doing so, for example, may allow the content analysis provided by the client device 10 to be more efficient. In many circumstances, electronic content is allowed or blocked on the client device 10 without the client device 10 having to perform the more robust analysis or access the server for such an analysis. In such circumstances, access to the electronic content, when permitted, may be provided more quickly than it otherwise would be provided if the client device had performed a more robust and time-consuming analysis. Similarly, threshold values, such as those used in block 370 may be selected to provide various advantages, for example, to ensure that electronic content access is not excessively slowed. In one exemplary embodiment, a user, such as a parent or guardian, is able to set and adjust the thresholds to customize access control given, as one example, the performance constraints of the user's particular computer environment. A user with very slow network connection may minimize the range between the minimum threshold value and the maximum threshold value so that few or no electronic content access determinations involve accessing a remote device through the relatively slow network connection.

Returning to FIG. 2, after requesting remote assistance in block 280, the method waits for a response. If the response is negative or no response is received within a timeout period, the method 200 proceeds to block 270 and blocks access to the content. However, if the response is positive, the method 200 proceeds to block 240 and allows access to the electronic content.

Optionally, based on whether the electronic content is blocked, as in block 270, or access is allowed, as in block 240, a client device may provide information to other devices. For example, client device 10 through update module 26 may send information about electronic content, e.g., identifying whether the content was allowed or blocked, to analysis server 40. Analysis server 40 may use such information in its own analysis of the electronic content, for example, in server-side analysis module 40 and/or in providing updates to client device 10 and other client devices.

More generally, analysis server may store information useful in client-side electronic content access determinations and may distribute and provide updates to such information for use on client device 10 and other client devices. For example, client device 10 may store a list of banned electronic content in database 10. The update module 26 of access control module 22 may maintain such a list to correspond to a banned content list 42 maintained on server 40. The update module 26 may periodically access or receiving updates by communication with analysis server 40. Alternatively, updates may be pushed from the analysis server 40 to the client device 10 on a daily, weekly or monthly schedule or based on the occurrence of a change or changes to information stored at the analysis server. Similarly, database 27 on client device 10 may comprise lists or information about banned keywords and banned phrases that are maintained to correspond to keywords and phrases 43 on analysis server 40. As another example, analysis server 44 may store, update, and distribute algorithms that are used client device 24 and other client devices to perform client-side electronic access determinations.

Those skilled in the art will appreciate that the methods described herein with respect to FIGS. 1-3 are provided by way of example only and that, for each such method, other steps and/or sequences of steps may be performed. Based on the foregoing, it can be seen that the present disclosure provides novel systems, methods and computer program products for controlling access to electronic content on a client device. In general terms, the present invention involves controlling such access, at least in part, based solely on information and processes performed at a client device. Such control may involve comparing a URL address of a requested webpage and keywords and phrases found on the webpage to updateable lists of banned URL Addresses and banned keywords and phrases to determine whether access to the electronic content will be allowed, blocked, or will depend upon further analysis performed by a remote device, such as a remote server. Accordingly, it should be understood that the foregoing relates only to certain embodiments of the invention, which are presented by way of example rather than limitation. Numerous changes may be made without departing from the spirit and scope of the invention as defined by the following claims.

General

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method comprising:
   identifying, at a computer device, a request for electronic content, wherein the electronic content is available to the computer device through a network;
   analyzing, locally at the computer device, the electronic content to determine a content score of the electronic content based on at least one of a banned keyword count and a weighted banned keyword count;
   blocking, at the computer device, access to the electronic content on the computer device if the content score is below a minimum threshold;
   allowing, at the computer device, access to the electronic content on the computer device if the content score is above a maximum threshold;
   requesting, from the computer device, that a remote device perform a remote analysis of the electronic content if it the content score is between the minimum threshold and the maximum threshold, wherein the remote analysis is a more computationally-intensive analysis as compared to the local analysis, and wherein at least one of the minimum threshold and the maximum threshold is adjusted according to one or more performance constraints of the computer device.

2. The method of claim 1 further comprising
   determining, prior to analyzing the electronic content locally at the computer device, that the electronic content is subject to a protected protocol.

3. The method of claim 1, wherein the content score is determined based at least in part on a comparison of the electronic content to banned keywords and phrases stored on the computer device.

4. The method of claim 3 wherein the banned keywords and phrases stored on the client device are updated based on banned keywords and phrases stored on the remote device.

5. The method of claim 1, further comprising the step of blocking access to the electronic content on the computer device if the electronic content is identified on a list of banned electronic content stored at the computer device.

6. The method of claim 1:
   wherein the electronic content is a webpage; and
   wherein the method further comprises the step of blocking access to the webpage on the computer device if a URL address associated with the webpage is on a list of banned URL addresses stored at the computer device.

7. The method of claim 1 wherein the content score is calculated based only on information stored locally on the computer device.

8. The method of claim 1 further comprising receiving a response to the request that the remote device perform the remote analysis, wherein the response is used to determine whether access to the electronic content will be blocked or allowed on the computer device.

9. The method of claim 1, wherein performance of the computer device is improved by adjusting at least one of the minimum threshold and the maximum threshold.

10. The method of claim 1 wherein identifying the request for electronic content comprises monitoring one or more communication ports at the electronic device.

11. A computer device executing program module for controlling access to electronic content on the computer device, the program modules comprising:
    a communication monitor configured to identify a request for electronic content, wherein the electronic content is available to the computer device through a network;
    a content analyzer configured to determine whether to grant access to the electronic content based at least in part on a content score determined by analyzing the electronic content, wherein the access will be allowed if the content score exceeds a maximum threshold and blocked if the content score is below a minimum threshold, and wherein at least one of the minimum threshold and the maximum threshold is adjusted according to one or more performance constraints of the computer device;
    a module configured to request that a remote device perform a more computationally-intensive analysis of the electronic content as compared to the determination by the content analyzer, if content score is between the minimum threshold and the maximum threshold; and
    an update module configured to update information stored on the computer device that is used by the content analyzer to determine whether access to the electronic content will be allowed, blocked, or will depend upon the more computationally-intensive analysis of the electronic content by the remote device.

12. The system of claim 11 wherein the information comprises banned keywords and phrases that are updated based on a list of banned keywords and phrases stored on the remote device.

13. The system of claim 11 the wherein information comprises a list of banned electronic content and is updated based on a list of banned electronic content stored on the remote device.

14. The system of claim 11 wherein the information comprises algorithms stored on the computer device and is updated based on a set of algorithms stored on the remote device.

15. The system of claim 11 wherein the information comprises a list of banned Uniform Resource Locators (URL) addresses and is updated based a list of banned URL addresses stored on the remote device.

16. The system of claim 11 wherein the communication monitor is configured for monitoring one or more communication ports at the computer device to identify the request for electronic content.

17. The system of claim 16 wherein disabling the communication monitor requires administrator privileges on the computer device.

18. The system of claim 11 wherein the program modules are modules of a web browser.

19. A non-transitory computer-readable medium on which is encoded program code, the program code comprising:
    program code for identifying, at a computer device, a request for electronic content, wherein the electronic content is available to the computer device through a network;
    program code for determining, at the computer device, whether the requested electronic content is subject to a protected protocol;
    program code, responsive to a determination that the requested electronic is subject to the protected protocol, for:
    analyzing, locally at the computer device, the electronic content to determine a content score, wherein analyzing the electronic content to determine the content score comprises at least one of identifying a banned keyword count or identifying a weighted banned keyword count;

blocking, at the computer device, access to the electronic content on the computer device if the content score is below a minimum threshold;

allowing, at the computer device, access to the electronic content on the computer device if the content score is above a maximum threshold;

requesting that a remote server device perform a more computationally-intensive analysis of the electronic content as compared to the local analysis to determine whether to grant access to the electronic content if the content score is between the minimum threshold and the maximum threshold, and wherein at least one of the minimum threshold and the maximum threshold is adjusted according to one or more performance constraints of the computer device.

* * * * *